US008543366B2

(12) United States Patent
Pree et al.

(10) Patent No.: US 8,543,366 B2
(45) Date of Patent: Sep. 24, 2013

(54) SIMULATING REAL-TIME SOFTWARE COMPONENTS BASED ON LOGICAL EXECUTION TIME

(75) Inventors: Wolfgang Pree, Salzburg (AT); Andreas Naderlinger, Salzburg (AT); Josef Templ, Salzburg (AT)

(73) Assignee: Wolfgang Pree GmbH, Salzburg (AT)

( * ) Notice: Subject to any disclaimer, the term of this patent is extended or adjusted under 35 U.S.C. 154(b) by 415 days.

(21) Appl. No.: 12/803,863

(22) Filed: Jul. 8, 2010

(65) Prior Publication Data

US 2011/0010160 A1    Jan. 13, 2011

(30) Foreign Application Priority Data

Jul. 10, 2009    (DE) .......................... 10 2009 027 627

(51) Int. Cl.
*G06G 7/62* (2006.01)
*G06F 9/46* (2006.01)

(52) U.S. Cl.
USPC ........................................... 703/13; 718/102

(58) Field of Classification Search
None
See application file for complete search history.

(56) References Cited

U.S. PATENT DOCUMENTS 6,952,825 B1 * 10/2005 Cockx et al. ................... 718/102
2004/0102940 A1    5/2004 Lendermann et al.

FOREIGN PATENT DOCUMENTS

EP    1 870 806 A1    12/2007

OTHER PUBLICATIONS

Pree et al., "Simulink Integration of Giotto/TDL", ASWSD 2004, LNCS 4147, 2006, pp. 137-154.*
Farcas et al. "Transparent Distribution of Real-Time Components Based on Logical Execution Time", 2005, LCTES '05, pp. 31-39.*
Werner, A. "VisualTDL The Timing Description Language Interated in Simulink", Aug. 30, 2005, Technical Report 10, 94 pages.*
Gerald Stieglbauer, "Model-based Development of Embedded Control Software with TDL and Simulink", Department of Computer Science, University of Salzburg, Jul. 6, 2007, 341 Pages.
P. Defier, et al., "Simulation of LET Models in Simulink and Ptolemy", C. Doppler Laboratory, University of Salzburg, Monterey Workshop 2008, Budapest, Sep. 24-26, 2008, 10 Pages.
Andreas Naderlinger, et al., "Model-Driven Development of FlexRay-Based Systems with the Timing Definition Language (TDL)", 4th International ICSE workshop on Software Engineering for Automotive Systems, Minneapolis, May 26, 2007, 6 Pages.
Emilia Farcas, et al., "Hyperperiod Bus Scheduling and Optimizations for TDL Components", 12th IEEE Conference on Emerging Technologies and Factory Automation (ETFA), Patras Greece, IEEE, Sep. 2007, 8 Pages.
Josef Templ, "Timing Definition Language 1.5 Specification", Jul. 2, 2009, 37 Pages.
Thomas A. Henzinger, et al., "The Embedded Machine: Predictable, Portable Real-Time Code", PLDI'02, Jun. 17-19, 2002, Berlin, Germany, 12 Pages.
Thomas A. Henzinger et al., "Giotto: A Time-Triggered Language for Embedded Programming", Proceeding of the IEEE, vol. 91, No. 1, Jan. 2003, pp. 84-99.
Farcas, et al., "Transparent Distribution of Real-Time Components Based on Logical Execution Time," XP-002602362, Department of Computer Science, Jun. 2005.

* cited by examiner

*Primary Examiner* — Suzanne Lo
(74) *Attorney, Agent, or Firm* — Muirhead and Saturnelli, LLC

(57) ABSTRACT

A system for simulating a real-time system using a block-oriented simulation with a static block-update order comprises: a clock providing a time base; a first task function block with a task release block, a task execution block, a task termination block, and a delay block; a first trigger block that triggers the task release block at a first time; and a second trigger block that triggers the task termination block at a third time. The task execution block calculates an output value dependent on an input value. The task release block receives input data from a data source and sets the input value. The task termination block provides the output value to a data sink. The first or second trigger function block triggers the task execution block at a second time provided by the clock. The delay block is arranged between the task release and task termination blocks.

17 Claims, 4 Drawing Sheets

SIMULATING REAL-TIME SOFTWARE COMPONENTS BASED ON LOGICAL EXECUTION TIME

TECHNICAL FIELD

This application relates to the simulation of systems that have to meet strict real-time requirements (real-time systems) and, more particularly, to the simulation of real-time systems based on real-time software components that use the concept of Logical Execution Time (LET).

BACKGROUND

Real-time systems are often employed in control systems to implement control laws for controlling technical processes. In many applications these real-time systems comprise distributed hardware, i.e. the software for the various tasks that are necessary for control purposes is executed on separated processors. Conventional systems for executing distributed software may comprise a plurality of nodes and at least one communication channel, wherein the system is configured such that the nodes are allowed to transmit data across the communication channel. Examples of such systems also include so called embedded systems in which the nodes which can also be referred to as electronic control units (abbreviated ECUs). An ECU may perform the tasks defined by software and may be encapsulated in the device which it controls.

Examples of embedded systems include automotive systems, automation systems, railway systems and avionics systems. An automotive system, for example, may in particular include a plurality of devices for operating brakes, a plurality of devices for sensing wheel speeds, a device for sensing the velocity of a vehicle etc. which communicate across a communication channel and which are configured to perform an operation of an anti-blocking system (ABS). Since the operation of an anti-blocking system is safety-critical to the vehicle and its passengers, it is required that repetitive readings of sensors, calculations and updating of actuators are performed periodically, for example, every five milliseconds. In practice, such a system has to fulfill strict real-time requirements, which means that a correctness of an operation depends not only upon a logical correctness of the operation but also upon a time at which it is performed. An operation performed later than a "deadline" defined within the system is, by definition, incorrect, and usually has no value. That is, the control system has to guarantee the compliance with predefined timing requirements.

Conventional software designed for real-time systems is typically configured such that the software is separated into a plurality of tasks which the system has to perform. The tasks can be executed by one ECU (i.e. one node) or by different nodes, whereby each single node may execute one or more tasks. Tasks may use output signals of sensors as their input and may provide output signals to actuators. Different tasks may communicate with each other by exchanging data. Thus, a schedule and the execution of tasks may depend on external events which can be detected by the system using one or more sensors. Thus, a mode of operation of any system on any node may change over time, and also demands on the communication channel with respect to band width may change over time. However, in the hard real-time system it has to be assured that a given band width provided by the communication channel is sufficient to guarantee fault free operation of the hard real-time system during each possible combination of operational modes of all of the involved nodes.

It is well-known in the art that the development of absolutely correct embedded systems with hard real-time requirements is difficult, error-prone and thus expensive. This is true for single-node systems as well as for distributed embedded systems.

Various efforts have already been made for improving the design and development of potentially distributed embedded systems. For example, a project called "Giotto" at the University of California at Berkeley, USA resulted in a programming methodology for embedded control systems. This methodology includes a concept of defining a logical execution time of tasks under hard real-time conditions. This concept is referred to as "LET" (Logical Execution Time) and illustrated in more detail in the article of T. A. Henzinger et al. (see T. A. Henzinger et al., "Giotto: A time-triggered language for embedded programming", Proceedings of the IEEE, Vol. 91, Issue 1, January 2003, pp. 84-99). Giotto provides a programming abstraction for hard real-time applications which exhibit time-periodic and multi-modal behavior, as in automotive, aerospace, and manufacturing control. Traditional control design happens at a mathematical level of abstraction, with the control engineer manipulating differential equations and mode switching logic using tools such as, for example, MATLAB/Simulink, LabView or MatrixX. Typical activities of the control engineer include modeling of the plant behavior and disturbances, deriving and optimizing control laws, and validating functionality and performance of the model through analysis and simulation. If the validated design is to be implemented in software, it is then handed off to a software engineer who writes code for a particular platform (here the word "platform" is used to stand for a hardware configuration, either a single node or a distributed system, together with a real-time operating system).

Typical activities of the software engineer include decomposing the necessary computational activities into periodic tasks, assigning tasks to CPUs and setting task priorities to meet the desired hard real-time constraints under the given scheduling mechanism and hardware performance, and achieving a degree of fault tolerance through replication and error correction.

Giotto provides an intermediate level of abstraction, which permits the software engineer to communicate more effectively with the control engineer. Specifically, a software architecture of the implementation is defined which specifies its functionality and timing. Functionality and timing are sufficient and necessary for ensuring that the implementation is consistent with the mathematical model of the control design. "Correct-by-construction development" means that the implementation of an embedded system that corresponds exactly to its specification is automatically generated. This allows for abstracting away from the realization of the software architecture on a specific platform, and frees the software engineer from worrying about issues such as hardware performance and scheduling mechanism while communicating with the control engineer. After coming up with a Giotto program, the second task of the software engineer is still to implement the program on the given platform. However, in Giotto, this second task, which requires no interaction with the control engineer, is effectively decoupled from the first, and can be automated by increasingly powerful compilers. The separation of logical correctness concerns (functionality and timing) from physical realization concerns (mapping and scheduling) has the added benefit that the timing definition is entirely platform independent and can be compiled on different, even heterogeneous, platforms.

A language partly based on the concepts of the Giotto language for specifying a timing behavior of distributed software has been developed by Wolfgang Pree and his team in an ad personam research project at the Paris Lodron University of Salzburg, Austria. This language is referred to as "TDL" (Timing Definition Language) and defined in the report of Josef Templ (see J. Templ., "Timing Definition Language (TDL) 1.5 Specification", Technical report, University of Salzburg, 2009).

Real-time software components based on the concept of Logical Execution Time (LET) exhibit equivalent observable behavior independent from the execution platform and, respectively, the simulation environment. Thus, the concept of LET ensures a perfect match between simulation and execution on a (potentially distributed) hardware without having to consider platform specific details already in the application model.

Especially for complex multi-mode multi-rate systems, a virtual machine (VM) may be an appropriate approach to ensure the correct timing behavior. Simulation environments typically provide a trigger mechanism that allows for implementing such a VM. This disclosure discusses data dependency problems that may arise when simulating LET-based components and that considerably limit the applicability of existing approaches in practice. The identified shortcomings concern components with cyclic data flow, control loops involving plants without delay, and the combination of LET-based and conventional components.

Accordingly, it would be desirable to provide a system and a method for simulating LET-based components that does not exhibit the above mentioned shortcomings.

SUMMARY

According to the system described herein, a system for simulating a real-time system using a block-oriented simulation with a static block-update order comprises a clock providing a time base for the simulation; a first task function block that includes a task release block, a task execution block, a task termination block, and a delay block; a first trigger block configured to trigger the task release block at a first time provided by the clock; and a second trigger block configured to trigger the task termination block at a third time provided by the clock. The task execution block is configured to calculate an output value dependent on an input value in accordance with a desired transfer function. The task release block is configured to receive input data from a data source and to set the input value of the task execution block dependent on the received data. The task termination block is configured to provide the output value of the task execution block as output data to a data sink. The first trigger function block or the second trigger function block is configured to trigger the task execution block at a second time provided by the clock. The delay block is arranged between the task release block and the task termination block.

In an example of the system described herein, the first time and the third time may be subsequent points of time. The time that elapses between the first time and the third time equals the logic execution time (LET) of the task function block, and the second time either lies in the interval between the first time and the third time or is equal with the first time.

According further to the system described herein, a method for simulating a real-time system using a block-oriented simulation system with a static block-update order is provided. The method includes providing a first task function block that includes a task release block, a task execution block, a task termination block, and a delay block; triggering the task release block at a first time; triggering the task execution block at a second time after or equal to the first time; triggering the task termination block at a third time at or after the second time; delaying data flow between the task release block and the task execution block and/or delaying the data flow between the task execution block and the task termination block, wherein the task execution block calculates, when triggered, an output value dependent on an input value in accordance to a desired transfer function, wherein the task release block receives, when triggered, data from a data source and sets the input value of the task execution block dependent on the received data, and wherein the task termination block provides, when triggered, the output value of the task execution block as data to a data sink. The system described herein may further include a computer readable medium storing computer software with executable code that, when executed, performs the above-noted method.

BRIEF DESCRIPTION OF THE DRAWINGS

Embodiments of the system described herein will be explained in more detail on the basis of the figures of the drawings, which are briefly described as follows.

Figure 1:
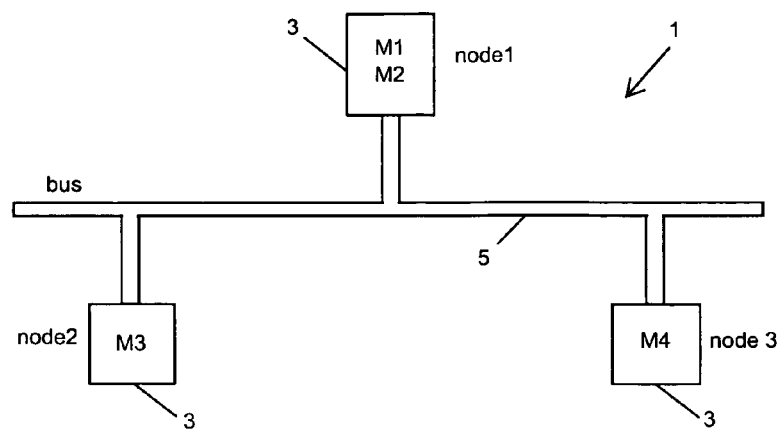
FIG. 1 shows a schematic diagram illustrating a system for performing distributed software according to an embodiment of the system described herein.

In the drawings similar components are denoted with the same reference symbol.

DETAILED DESCRIPTION OF VARIOUS EMBODIMENTS

The foregoing as well as other advantageous features of the invention will be more apparent from the following detailed description of exemplary embodiments of the system described herein with reference to the accompanying drawings. It is noted that not all possible embodiments of the present invention necessarily exhibit each and every, or any, of the advantages identified herein.

Modeling and simulation environments enable the developer to design an application step-by-step and to continuously test, analyze and optimize its behavior already early in the development process. Automatic code generators transform models typically into C code that is compiled later and executed on some target platform. But although the generated code may perfectly match the modeled functionality, when executed on an actual hardware platform, the application is likely to show slightly different or even totally unexpected behavior.

On a hardware platform, the execution of some control task functionality or network communication may take a considerable amount of time, whereas the execution in a simulation environment completes basically without any time consumption. Especially for distributed systems it is common practice to relax this mismatch by introducing additional, arbitrary platform-dependent delays in the intrinsically platform neutral model. In other words, model simulation and execution of the corresponding code are only approximately the same at best and, as the generated code is typically fine-tuned manually, the correspondence to the model is lost.

The concept of logical execution time (LET) mentioned above in the introductory part abstracts from a particular platform and communication topology. This allows someone to change the underlying platform and even to distribute components between different nodes without affecting the overall system behavior, provided that enough computing and communication resources are available. This enhances the status of simulation environments considerably as simulation results match the behavior on a target platform perfectly. Previous work showed that simulating LET based applications is feasible in principle using the common simulation system MATLAB/Simulink (see G. Stieglbauer: "Model-based Development of Embedded Control Software with TDL and Simulink", PhD thesis, University of Salzburg, 2007).

The further discussion focuses on three aspects which immediately arise in practice and which require refining previous simulation approaches: (1) the simulation of multiple LET-based components with cyclic data dependencies; (2) the simulation of control loops involving plants without delay; and (3) the stepwise migration of simulation models towards LET.

Before going into detail with the simulation, a short introduction to the above-mentioned Timing Definition Language ("TDL") is given below. TDL is an advanced implementation of the LET-concept of the Giotto Language.

The Timing Definition Language (TDL) is a high-level software description language that allows the explicit timing specification of hard real-time components in a platform independent manner. TDL is based on the logical execution time abstraction (LET) known from the Giotto Language. LET means that the observable temporal behavior of a task is independent from its physical execution. The only necessary assumption is that the physical task execution is fast enough to fit somewhere within the logical start and end points. For a particular platform this has to be ensured via an adequate scheduling given the worst case execution time for each task. The inputs of a task are read at the release time and the newly calculated outputs are available at the terminate time. Between these two logical instants, the outputs have the value of the previous execution. Although LET introduces additional response time overhead, it provides the cornerstone to deterministic behavior, platform abstraction, and well-defined interaction semantics between parallel activities. In order to support complex applications, TDL introduces a component model. Applications can be decomposed into individual components, each represented as a TDL module.

Below, the concepts of LET ("logical execution time") and the basic technical terms "module", "mode", "task", "port", and "guard" are explained in order to ease the further technical discussion.

A module performs computations represented as tasks and communicates with the environment using sensors and actuators. Modules may import one or more other modules and access their public entities. At runtime, all modules of an application run in parallel. Thus, a TDL application is the parallel composition of a set of TDL modules, which are synchronized to a common time base. A module may comprise one or more modes, but is in exactly one mode at a time.

A mode is a particular operational state of a module. Modes have a period and consist of a set of activities. An activity can be a task invocation, an actuator update, or a mode switch. Each activity specifies its own logical execution instants relative to the mode period. The LET of a task is always greater than zero, whereas actuator updates and mode switches are executed in logical zero time (LZT) which essentially means "fast enough and thus negligible".

A task represents a computational unit of an application. A task declares an external function, which can be implemented in any imperative language such as, for example, C. Furthermore, a task declares input, state, and output ports.

Ports are typed variables used for data communication. TDL differentiates between task ports, sensors and actuators. A guard is an external Boolean function. Guards may be used to execute mode activities conditionally.

FIG. 1 shows a system 1 comprising three nodes 3 labeled as "node 1", "node 2" and "node 3", respectively, and which are connected to a communication channel 5 labeled as "bus". The bus is used for data communication between the nodes 3. The nodes are electronic devices which are in some fields of application, such as the automotive industry, referred to as electronic control units (ECU). Each node may include a dedicated piece of hardware which interfaces the node with the communication channel and which is then commonly referred to as a controller. In the example illustrated in FIG. 1, the communication channel is embodied as a bus having broadcasting semantics which means that data transmitted to the communication channel from one of the nodes may be received by any of the other nodes. The system described herein is, however, not limited to such a communication channel but encompasses also communication channels of other suitable topology and semantics.

System 1 is configured to execute software which is composed of several modules M1, M2, M3 and M4. Modules are an example of a method of structuring complex software, and a module generally is a piece of software having an application programming interface (API). Software which is composed of plural modules allows transparent distribution of the software over plural nodes for executing the software. In the example illustrated in FIG. 1, node 1 executes modules M1 and M2, node 2 executes module M3 and node 3 executes module M4.

Figure 2:
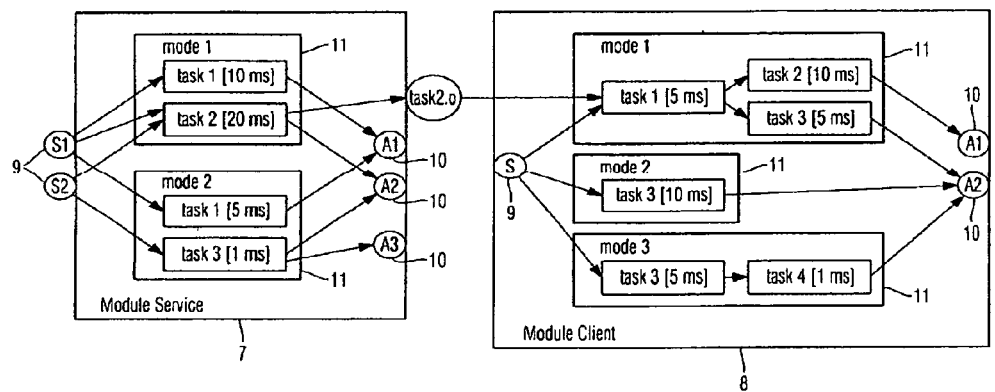
FIG. 2 is a schematic diagram representing exemplary modules according to an embodiment of the system described herein.

A more specific example of software composed of two modules is illustrated in FIG. 2. The exemplary software shown in FIG. 2 comprises a first module 7 labeled as "Module Service" and a second module 8 labeled as "Module Client". Each module may comprise a set of sensors 9, a set of actuators 10 and a set of modes 11. The sensors 9 of module 7 are labeled "S1", "S2", and the sensor 9 of module 8 is labeled "S". The actuators 10 of module 7 are labeled as "A1", "A2" and "A3", and the actuators 10 of the module 8 are labeled as "A1" and "A2". Module 7 has two modes 11, labeled as "mode 1" and "mode 2". Module 8 has three modes 11, labeled as "mode 1", "mode 2" and "mode 3".

Each module 7, 8 may be in only one mode at a given time. Mode 1 of module 7 comprises two tasks labeled as "task 1" and "task 2", wherein task 1 is repetitively executed at a first period of ten milliseconds as indicated by "[10 ms]", and task 2 is repetitively executed at a period of twenty milliseconds indicated by "[20 ms]".

Figure 3:
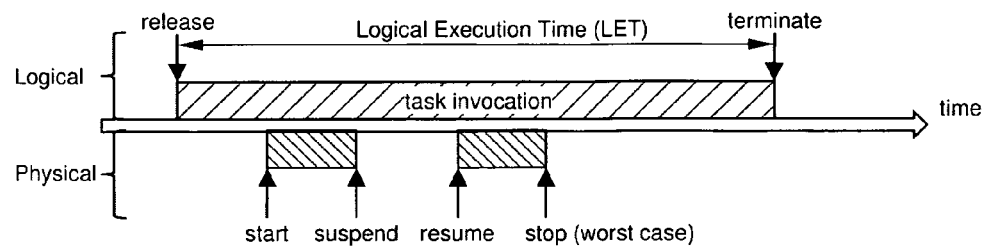
FIG. 3 is a schematic diagram for illustrating the concept of the Logical Execution Time (LET) according to an embodiment of the system described herein.

In the present example, task invocations might adhere to the LET semantics as introduced by the Giotto programming model (see the article of T. A. Henzinger et al. mentioned in the introductory part). Task invocation according to LET is illustrated in the schematic diagram of FIG. 3. The inputs of the task are read at the beginning of a LET period. The reading of the inputs is practically done in close to zero time, what is called "logical zero time" (LZT). The beginning of the LET period is indicated by the arrow labeled "release" in FIG. 3. Newly calculated outputs of the task are available exactly at the end of the LET period which is indicated by an arrow labeled "terminate" in FIG. 3. The physical execution of the task on the node is started at a time indicated by an arrow labeled "start" and terminated at a time indicated by an arrow labeled "stop", wherein the physical execution of the task is suspended at a time indicated by an arrow labeled "suspend" and resumed at a time indicated by an arrow labeled "resume".

The time of physical execution within the LET period is not defined by LET. However, it is a requirement that the physical execution of the task has to finish before the end of the LET period. In other words, the start of the physical execution of the task can take place at or after the beginning of the LET period, and the end of the physical execution of the task has to occur at the latest, also for the worst case, before or at the end of the LET period. According to the LET semantics, the results of the calculation of the task are only available to the outside of the task at and after the end of the LET period rather than at the end of the physical execution of the task. This means, that before the end of the LET period, only the "old" results of the previous invocation of the task are available.

Referring back to FIG. 2, task 1 of mode 1 of module 7 is repetitively executed at a period of ten milliseconds wherein the sensor is red exactly at the beginning of the ten-millisecond-period (in LZT) and wherein the results of the calculation of task 1 are made available to actuator A1 exactly at the end of the ten-millisecond-period.

FIG. 2 also illustrates communication between tasks. For example, task 1 in mode 1 of module 8 delivers its output as inputs to task 2 and task 3.

Further, FIG. 2 illustrates communication of tasks across module boundaries. An output of task 2 of mode 1 of module 7 is labeled as "task2.o" and is provided as an input to task 1 of mode 1 of module 8.

The composition of the software of a set of modules and the definition of the tasks of the modules according to LET semantics allows transparent distribution of the software across one or plural nodes, wherein a temporal behavior of the software is guaranteed. In particular, adding a new module will never affect the observable temporal behavior of other modules as long as internal scheduling mechanisms of the respective nodes guarantee a conformance to LET, given that worst case execution times (WCET) and execution rates are known for all tasks.

Figure 4:
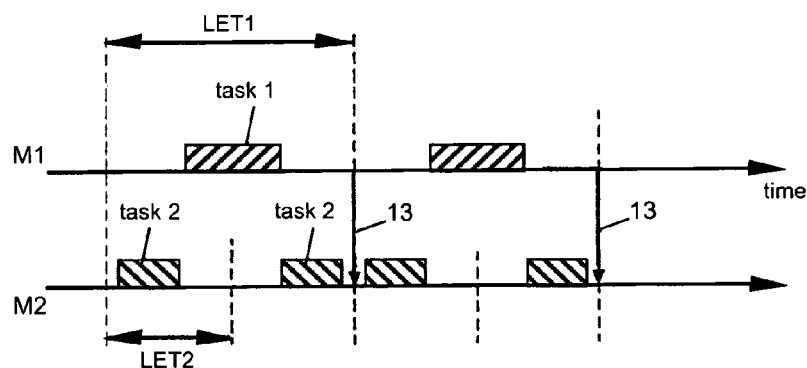
FIG. 4 is a schematic diagram illustrating concurrent executions of different tasks on one node according to an embodiment of the system described herein.

FIG. 4 is an illustration of the execution of modules M1 and M2 by node 1 shown in FIG. 1. Module M1 has one task, "task 1", with LET1, and module M2 has one task, "task 2", with LET2. Task 2 uses the output of task 1 as input, and LET1 of task 1 is twice as large as LET2 of task 2. The rectangles in FIG. 4 schematically indicate the physical execution times of task 1 and task 2. The outputs of task 1 are made available to task 2 at the end of the logical execution time LET1 of task 1 as indicated by arrow 13. This can be achieved by copying values from a location of memory associated with task 1 to a location of memory associated with task 2. Such copying will take close to zero time (logical zero time, LZT) on a single node.

Both the third and fourth invocations of task 2 shown in FIG. 4 will use the output of the first invocation of task 1. This means that the fourth invocation of task 2 will not use the output of the second invocation of task 1 even though physical execution of the second invocation of task 1 is already completed when the physical execution of the fourth invocation of task 2 begins.

Giotto as well as TDL Programs are executed using a virtual machine (VM) which is responsible for ensuring the correct timing behavior. For TDL programs such a VM is called E-Machine (Embedded machine). The E-Machine is a VM that lays the foundation for platform-independent real-time software, while the implementation of the VM itself depends on the platform (e.g. the operating system). The E-Machine ensures the correct timing behavior of real-time applications. Therefore, the timing behavior described in TDL components is compiled into an intermediate code, called the Embedded Code or E-Code. The E-Code describes an application's reactivity, i.e. time instants to release or terminate tasks or to interact with the environment. It is a portable description as it relies on logical timing and is independent of a particular platform. E-Code is represented as a sequence of instructions that are interpreted by the E-Machine (see T. A. Henzinger, C. M. Kirsch, "The embedded machine: predictable, portable real-time code", Proceedings of the ACM SIGPLAN 2002 Conference on Programming language design and implementation, pp. 315-326).

The E-Code instruction set for TDL builds on the set defined for the Giotto language. A TDL E-Code instruction c(args) consists of the command c and its list of integer arguments args. All commands are executed synchronously: call(d) executes the driver d; release(t) marks the task t as ready for execution; future(a, dt) plans the execution of the E-Code block starting at address a in dt microseconds; if (g, aelse) proceeds with the next instruction if g evaluates to true else jumps to aelse; jump(a) jumps to the E-Code at address a; switch(m) performs a mode switch to mode m, i.e. the E-Machine continues with the first instruction of m; return terminates an E-Code block; nop(f) is a dummy (no operation) instruction, where f is used as a marker for identifying different sections in the E-Code.

According to the E-Code instructions the E-Machine timely hands tasks to a dispatcher and executes drivers. A driver performs communication activities, such as reading sensor values, providing input values for tasks at their release time or copy output values at their termination time. TDL compiler plug-ins generate drivers automatically for a certain platform according to the language binding rules. They are part of the so-called "glue code" which additionally comprises type declarations, etc., as well as the communication layer. The functionality code, i.e. task-, guard-, initializer-, sensor- and actuator functions, has to be provided separately.

A major advantage of the LET abstraction is the identical behavior of real-time applications on any platform that is powerful enough. This makes simulation of LET-based applications particularly useful. Most simulation environments fail in considering non-functional properties such as timing, in particular for distributed applications.

Typically, simulation results can only be seen as approximate estimations for the actual behavior on a real hardware target. By considering a simulation environment as yet another platform, the LET assumption guarantees an equivalent behavior. Thus, the behavior of a model simulation exactly matches the behavior shown in practice. As communication latencies can be subsumed under the logical execution time (LET); the simulation may be totally independent from the intended communication topology.

Figure 5:
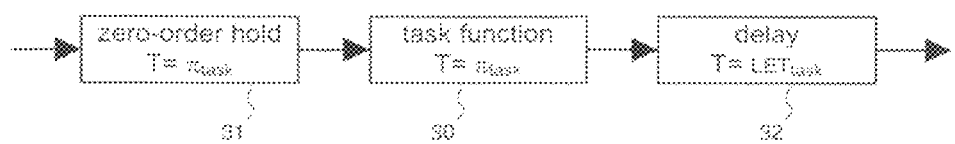
FIG. 5 is a schematic diagram illustrating LET behavior of a task by using simulation blocks according to an embodiment of the system described herein.

To achieve LET semantics of a task in a simulation environment, the simulation engine must ensure that (1) the task is released and terminated at well-defined logical points in time, that (2) inputs are only read once when the task is released, and (3) output ports are solely updated when the task terminates logically. FIG. 5 shows a data flow diagram that exhibits such semantics. A task function block 30 which implements the task's functionality is associated with a sample time T equal to the period $\pi_{task}$ of the task. Additionally, it is surrounded by a zero-order hold block 31 and a discrete delay block 32. The sample time of the zero-order hold block is set to the task's period $\pi_{task}$, which ensures that input values do not change while the task executes. The sample time of the delay block is set to the logical execution time $LET_{task}$ of the task, which ensures that the newly calculated output values are available only after the task has logically terminated.

This approach is straightforward, however, it fails when mode switching logic and multiple execution rates have to be considered. Typically, control systems comprise periodically executed tasks and involve mode-switching logic. Dependent on the current mode of a module, the application executes individual tasks with different timing constraints or even changes the set of executed tasks. It is difficult to understand the overall behavior of the model and it becomes too inefficient for all except trivial applications. Furthermore, it is unsolved how to obtain the exact TDL semantics in the general case of a multi-mode multi-rate system.

Basically, simulating a system described as a block diagram as illustrated, for example, in FIG. 5 involves repeatedly (1) solving all block output equations, (2) updating the state variables of the system, and (3) advancing time. In principle, there exist different strategies for item (1). The blocks could be executed in arbitrary order until the outputs do not change anymore, i.e. a fixed point (steady state) is reached. As a consequence, this approach is rather inefficient.

Modern simulation systems, such as, for example, the MATLAB/Simulink simulation tool, therefore follow a different strategy. A sorted block order is derived from the initialization of the simulation, which avoids the need for iteration. At each simulation step, the blocks are executed in this fixed order that does not necessarily comply with the block connections, but also depends on the feedthrough characteristics of each block. A block with direct feedthrough must know its current input values before it can set its output values. Assuming a model with discrete blocks only, at each simulation step, the simulation-engine (e.g. Simulink) computes the model's outputs by invoking the output method (cf. the method "mdlOutputs" in MATLAB/Simulink) of each block in the sorted order derived during the initialization. Afterwards, the engine computes the state of the model by invoking the update method of each block (cf. the method "mdlUpdate" in MATLAB/Simulink), again in the predefined order.

In the regular case, the execution order of blocks is under control of the simulation environment. This is not true for so-called "conditionally executed subsystems", which comprise for example triggered subsystems. A subsystem is a block that contains other blocks and thus provides for hierarchically structuring blocks. One example of a trigger is a function call, which might for example originate from an S-function block (see below). Conditionally executed subsystems are not part of the sorted block order. Instead, they are executed in the context of their initiating block and thus kind of "inherit" the position in the sorted block order. This position of the initiating block, however, is determined by feedthrough characteristics mentioned above and data dependencies of itself and of all the blocks it triggers. An initiating block autonomously decides which blocks to execute and in which order.

For the following discussion the MATLAB/Simulink simulation environment has been chosen as an exemplary simulation tool. However, the system described herein is not limited to the MATLAB/Simulink simulation environment and is also applicable to any other simulation tool that uses a static block update order based on topologically sorting the blocks according to the data flow involved.

The built-in Simulink block-set can be extended by so-called "S-Functions", which are Simulink blocks implemented in a programming language such as, for example, C. S-Function blocks are allowed to trigger the execution of function-call subsystems by using the Simulink macro "ssCallSystemWithTid" in their "mdlOutputs" method. After the function call subsystem was executed, the program control is returned to the S-Function which resumes execution.

The E-Machine discussed above is realized in Simulink using an S-Function that contains the E-Code interpreter. Task-, guard-, and initializer functions are implemented using function-call subsystems, which have to be modeled by the application developer using ordinary (i.e. standard) Simulink blocks. The glue code, which is needed for performing communication activities such as reading sensors or copying values from task ports to actuators, is also realized as function-call subsystems. They all get initiated (i.e. triggered) by the E-Machine at appropriate times.

The output ports of such a driver subsystem are directly connected to its input ports, which corresponds to assignments in the imperative programming paradigm as soon as the system is triggered. The TDL tool-chain generates the driver subsystems automatically when the simulation is started. Only the timing, i.e. the TDL description, has to be specified and the functionality, e.g. task function subsystems, has to be modeled.

Figure 6:
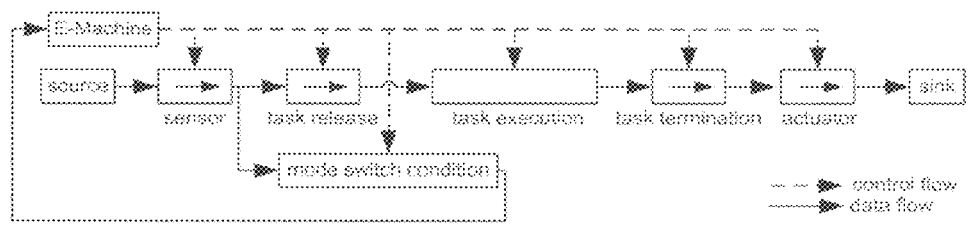
FIG. 6 is a schematic diagram for illustrating the concept of one E-Machine per module in a simulation environment according to an embodiment of the system described herein.

FIG. 6 exemplifies this E-Machine approach for a simplified application. The placement of the individual blocks conforms nto the data flow, which is basically from left to right along the arrows from a source (output of a given block) to a sink (input of a subsequent block). The source value is read by a sensor which provides the value to a guard and a task. The actuator block uses the output port of a task to write to a sink. Regarding execution order, the figure should not be read from left to right. The E-Machine triggers the individual blocks according to the E-Code resulting in the above order of activity execution. This also ensures the correct LET behavior of a task by triggering its release and termination drivers at the right time instants.

When the E-Machine triggers the execution of a guard, it immediately reads the result via an input port. The result influences the further execution of E-Code instructions and consequently influences, too, which subsystem is to be triggered. Thus, the E-Machine block has direct feedthrough. The E-Machine has to be invoked whenever the simulation time matches the logical time of a TDL activity as defined in the E-Code. To ensure this, we use a fixed-sample time for the E-Machine (E-Machine period), which is the GCD (greatest common divisor) of all activity periods.

The S-Function implementation of the E-Machine for a simulation environment as illustrated in FIG. 6 results in a straight forward and efficient simulation model. However, due to data dependency problems which can occur in simulation environments, its practical applicability turned out to be limited, especially when simulating control applications having one or more feedback loops.

The following application scenarios can generally not be handled by the simple approach discussed above with respect to FIG. 6: (1) Cyclic import relationships between LET-based components (controllers), (2) control loops involving plants without delay, and (3) mixed LET-based and conventionally modeled controllers. Theses three cases are discussed in more detail below. They are all related to cyclic data flow and the ability of the simulation environment to find a valid strategy for executing each individual block. Most of the commonly used simulation environments (MATLAB/Simulink, Lab-View, etc.) do not support or at least do not fully support models that include loops without a delay (algebraic loops).

Delays are introduced by explicit delay blocks, or by other blocks whose inputs have indirect feedthrough. Indirect (or non-direct) feedthrough means that a block's output y depends on the state x, but is not directly controlled by an input u of the respective block. For example, the delay block, which provides a delay time $\Delta$, is described by the following state space description $$y(t)=x(t), x(t+\Delta)=u(t),$$

where $\Delta$ is the delay (e.g. the sample time of the block).

In the following discussion the MATLAB/Simulink simulation environment is, again, used as an exemplary simulation environment for the purpose of an illustrative explanation.

Import relationships lead to Simulink signals between driver blocks of different modules. Looking at the example of FIG. 2, the termination driver of task 2 in the module 7 "Service" is connected to the release driver of task 1 in module 8 "Client". As already discussed above, Simulink uses a fixed block update order in which blocks are executed. In case of a feed-back loop from the module 8 "Client" to the module 7 "Service", such a predefined execution order rules out the approach using one E-Machine per module (cf. FIG. 6), since, relative to other blocks, all drivers of a particular module are executed at once. Only one global E-Machine, which interprets the E-Code of all modules, leads to a model that follows LET semantics and is resolvable by the simulation engine.

Closed-loops are well known concepts in control theory (e.g. for PID controllers or any other kind of controllers). The controller monitors via sensors an output of the plant, i.e. the system under control, and adjusts its actuators to achieve a specified system response. Plants with direct feedthrough, i.e. without introducing a delay, must—as a whole—execute after actuators are updated and before sensors are being read. With the E-Machine approach of FIG. 6 both sensors and actuators are under control of one single S-Function block. Consequently, Simulink cannot find a valid update order of blocks.

Another scenario concerns the interaction between TDL modules (controllers) and controllers that are not LET-based, for example when a control application is migrated towards LET step-by-step. Typically, controllers are modeled as atomic (non-virtual) subsystems in Simulink in order to reflect the desired software partitioning in the simulation and the program synthesis. The equations defined by an atomic subsystem are evaluated as a unit. Usually, in order to avoid 'false' algebraic loops and to approximately mimic the computation time on a real hardware platform, unit delay blocks are added between controllers and the plant and also between multiple controllers.

Figure 7:
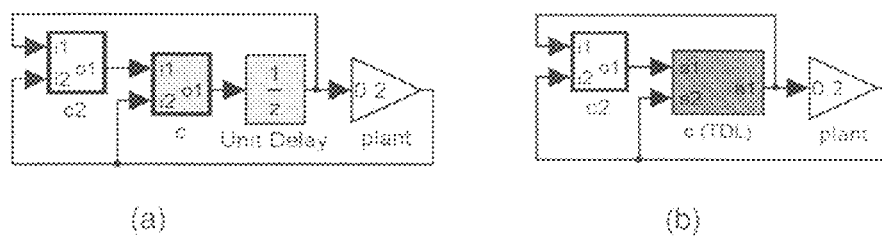
FIG. 7 is a schematic diagram for illustrating a model before (a) and after (b) migrating the controller c to TDL according to an embodiment of the system described herein.

FIG. 7a illustrates a sample model with two conventionally modeled controllers (labeled "c" and "c2") and a plant. FIG. 7b illustrates the same model partially based on LET. The controller c is replaced by a TDL module executing the former implementation as a task. The unit delay is now implicitly replaced by the task's LET ensured by the E-Machine. Again, the simulation environment MATLAB/Simulink cannot find a valid update order of blocks.

In any of these cases, Simulink reports a data dependency violation, which is similar to an algebraic loop error. From the control engineer's point of view, this appears to be counter-intuitive, since the LET of a task is always greater than zero and thus should introduce the required delay. However, due to the structure of the implementation of the E-Machine as illustrated in FIG. 6, the simulation environment does not "see" a delay.

In the following a novel mechanism for simulating LET-based software components is described. The simulation is also based on an E-Machine (see FIG. 6), but does not suffer from data dependency problems as described above.

First, new requirements concerning the E-Code representation are discussed and subsequently the execution strategy during the simulation. The described mechanism has been implemented in MATLAB/Simulink. However, the underlying concept is also applicable for other simulation environments. Finally, an enhancement that covers event-triggered system is discussed.

Data dependencies among TDL modules require the partitioning of E-Code into two sections. However, in order to execute the plant or other non-TDL blocks between setting actuators and reading sensors, E-Code must be split into three disjoint sections. These E-Code sections represent the following three phases:

tt task termination phase: The tt-phase includes all activities that must be carried out in order to make output ports available at the LET end of a task invocation. After that, the updated output ports are visible to client modules and may be used as input for any other activity.

au actuator update phase: The au-phase includes all activities that must be carried out in order to update actuators with new values, potentially including the evaluation of guards.

mstr mode switch and task release phase: The last phase mstr includes all activities that must be carried out in order to perform mode switches and to release new task invocations. Releasing a task invocation means to copy the actual parameters (stemming from sensors or task ports) to the input ports of the released task. This phase also comprises the execution of task functions.

Each phase must be executed for all TDL modules. This E-Code trisection is a requirement for simulating models with data dependencies as described above. From these dependencies, we can immediately derive the execution order of our three phases and the remaining blocks: (1) tt, (2) au, (3) non-TDL blocks, (4) mstr. To identify the individual phases at runtime we introduce markers (tags) in the E-Code that separate the corresponding sections from each other. Markers are represented as nop instructions with an appropriate flag: "eot" indicates the end of the tt section (phase), "eoa" indicates the end of the au section (phase).

It should be noted that a trivial solution to the data dependency violation is to put also all non-TDL blocks under the control of the E-Machine. This would basically result in a 4th E-Machine phase which is executed between the au-phase and the mstr-phase by an E-Machine trigger. However, this contradicts the understanding of an independent plant and brings about some drawbacks; above all, the limitation to no longer support continuous Simulink blocks.

Figure 8:
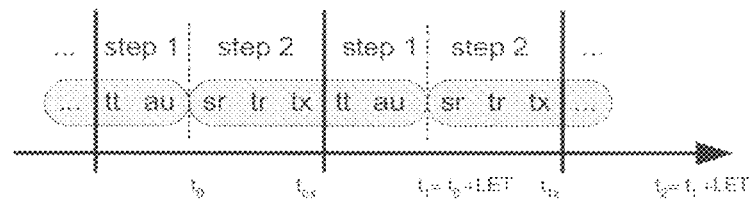
FIG. 8 is a schematic diagram for illustrating the separation of triggers into steps according to an embodiment of the system described herein.

One goal is to decouple the triggering of actuators and sensors in order to execute non-TDL blocks in between. FIG. 8 illustrates the execution of the individual triggers along the timeline for a simple example where a task reads from a sensor and updates an actuator: at time $t_0$-LET, a sensor output value is read (sr: "sensor read"), the task is released (tr: "task release") and executed (tx, "task execute"); at time $t_0$, the task is terminated (tt, "task terminate") and the actuator is updated (au, "actuator update"). Afterwards, but at the same logical time, the next invocation begins with executing sr, tr, and tx. The idea of this approach is to split the execution of all triggers for a particular logical time into two separate steps. Step 1 executes sensor-independent activities such as the termination of tasks and actuator updates, while step 2 executes activities that are potentially sensor-dependent such as the release driver of a task. Each step is executed from a different S-Function, so that the plant or other non-TDL blocks can be executed in between:

E-Machine 1 executes step 1, which comprises the execution of (1) task termination drivers, (2) actuator drivers, and (3) their guards if both do not depend on a sensor value; additionally, the E-Machine 1 executes (4) port initializer functions when the simulation starts.

E-Machine 2 executes step 2, which comprises the execution of the following activities: (1) sensor drivers, (2) mode switch drivers, (3) mode switch guards, (4) task release drivers, (5) task execution drivers, and (6) task guards; additionally, (7) actuator drivers and (8) their guards, if the actuator itself or the guard depends on a sensor value.

According to this scheme, the glue-code generator distributes the list of drivers (function-call subsystems) among the two E-Machines. Both E-Machines operate on the same E-Code and both are based on the same implementation. They only differ in their mdlOutputs-function.

Splitting the E-Code interpretation of one module into separate E-Machines introduces additional synchronization requirements. Mode switches performed by E-Machine 2 have to be signaled to E-Machine 1. More precisely, E-Machine 1 reads the a and dt argument of the last future instruction of E-Machine 2 via a Simulink signal to timely resume execution at the correct E-Code instruction.

After executing step 2, time passes because the LET of a task is always greater than zero. However, Simulink is not aware of this, as it is not apparent from the data flow. Consequently, without any further arrangements, Simulink could not derive a valid block update order and would still report a data dependency violation. Whenever data flow is implicitly delayed by the E-Machine, i.e. a future instruction is hit, the delay must be reflected in the simulation model. Time passes between the execution of a task and its termination, as well as between the E-Machine executions of step 2 and step 1. Thus placing a unit delay block between each tx and tt driver pair and between the two E-Machine blocks enables Simulink to find a valid block update order that exactly follows the LET semantics. The sample time of the delay blocks is set to the E-Machine period. Effectively, they have no impact on the observable timing behavior.

Figure 9:
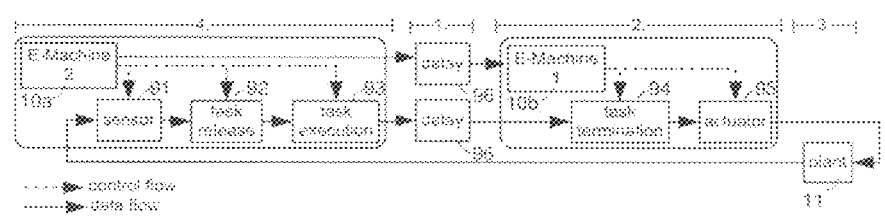
FIG. 9 is a schematic diagram for illustrating an E-Machine pair according to an embodiment of the system described herein.

FIG. 9 illustrates the 2-step E-Machine architecture and the block update order of the overall simulation system according to one example of the system described herein. The introduced delay blocks between the task execution and the termination driver and between E-Machine 2 and E-Machine 1 are executed first. Afterwards, the simulation environment executes E-Machine 1. The plant (or any other non-TDL block) executes third. Hereafter, the E-Machine 2 executes step 2.

To avoid illegal data dependencies caused by cyclic import relationships, all TDL modules in a simulation model have to be controlled by one single E-Machine pair only.

Figure 10:
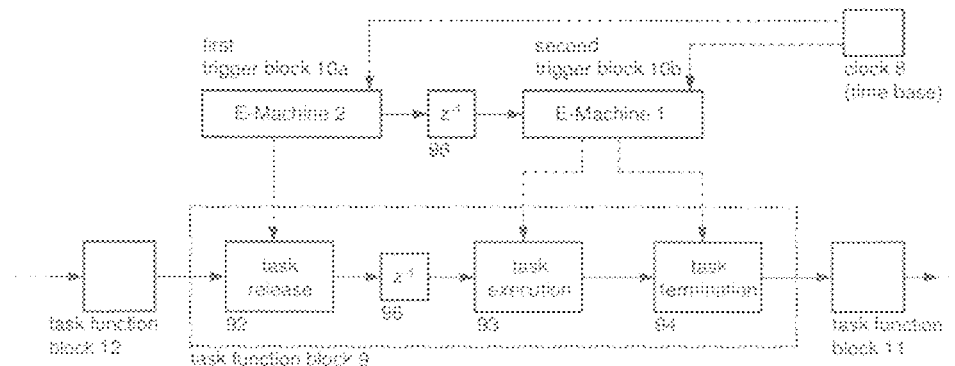
FIG. 10 is another schematic diagram for illustrating an E-Machine pair more generally according to an embodiment of the system described herein.

FIG. 10 illustrates the system shown in FIG. 9 in a more abstract context. A system for simulating a real-time system is shown, whereby a block-oriented simulation is used that has a static block-update order (i.e. topologically sorted blocks are used for simulation). For simulating a certain task of a mode of a module of a real time system, the exemplary system of FIG. 10 comprises a first task function block 9. The task function block 9 includes, as explained above with reference to FIGS. 8 and 9, at least (1) a task release block (tr) 92, (2) a task execution block (tx) 93, (3) a task termination block (tt) 94, and (4) a delay block 96, which, for example, may be a unit delay indicated by the transfer function $z^{-1}$ in the z-domain. The system of FIG. 10 further comprises a first trigger block 10a (E-Machine 2) and a second trigger block 10b (E-Machine 1) for triggering the above mentioned blocks 92, 93, 94 in accordance with a trigger-scheme given by the E-code that describes the timing.

Thus, the first trigger block 10a is configured to trigger at least the task release block (tr) 92 at a first point in time $t_0$. The second trigger block 10b is configured to trigger at least the task termination block (tt) 94 at a third point in time $t_1 = t_0 +$ LET, whereby LET is the logical execution time of the task function block 9.

The task execution block (tx) 93 which provides the desired functionality of the task function block is triggered—dependent on the position of the delay block 96—either by the first trigger block 10a or by the second trigger block 10b at a second point in time ($t_{0x}$). In the first case, the delay block 96 is arranged downstream of the task execution block (tx) 93 and in the latter case the delay block 96 is arranged upstream of the task execution block (tx) 93. Due to the delay block 96 algebraic loops are avoided and a static block update order can always be found before starting the actual simulation. Thus, using the system of FIG. 10 for simulation of real-time systems allows for simulating tasks which comply with the requirements of LET without experiencing problems in finding a static block update order.

The clock 8 provides a time base for the simulation. After starting the simulation, the E-Machine (trigger blocks 10a, 10b) "sees" (in regular time intervals given by the time base, whereby fixed step and variable step sample time may be supported) how much time has elapsed since the begin of the simulation and subsequently triggers the different blocks of each task function block (that follows the concept of LET) at the correct time as defined by the E-code.

The task execution block 93 is configured to calculate an output value dependent on an input value in accordance to a desired transfer function. That is, the task execution block 93 provides for the desired functionality of the task (which is implemented by the task function block 9), whereas the task release block 92 and the task termination block 94 execute in logical zero time (LZT, see FIG. 3). The task release block 92 is configured to receive input data from a data source (e.g. from a sensor 91 in the example of FIG. 9 or from a preceeding task function block 12) and to set the input value of the task execution block 93 dependent on the received data (e.g. to the received sensor output value). The task termination block 94 is configured to provide the output value of the task execution block 93 as output data to a data sink (e.g. to an actuator 95 in the example of FIG. 9 or to a subsequent task function block 11).

Due to the timing of the triggering of the blocks 92, 93, 94 ensured by the trigger blocks (E-Machines), the time difference between the triggering of the task release block 92 and the triggering of the task termination block 94 always equals the LET of the underlying task. In the case where the delay block 96 is arranged downstream of the task execution block 93 the task release block 92 and the task execution block 93 may be triggered simultaneously (i.e. the task release block 92 and the task execution block 93 may be merged).

Dependent on the actual implementation of the E-Machine and dependent on the requirements of the simulation environment actually used, some data flow might be necessary between the first an the second trigger block 10a and 10b. In this case, another delay block may be necessary between the first an the second trigger block 10a and 10b, thus delaying the data flow from the first trigger block 10a to the second trigger block 10b (e.g. by a unit delay $z^{-1}$).

Dependent on the application the sensor block 91 and the actuator block 95 shown in the example of FIG. 9 may be merged with the task release block 92 and the task termination block 94, respectively. This case is shown in the example of FIG. 10. However, the sensor block 91 and/or the actuator block may be necessary to separate input/output activities from task control activities during program development.

Generally the task release block 92 receives input data from a data source (e.g. the sensor block 91 or any preceding task function block 12) sets the input value of the task execution block 93 dependent on the received data, for example to a sensor output value. The task termination block 94 provides the output value of the task execution block 93 as output data to a data sink (e.g. the actuator block 95 or any other subsequent task function block 11).

The following references are incorporated herein by reference:

T. Henzinger, B. Horowitz, and C. Kirsch, "Giotto: A time-triggered language for embedded programming", Proceedings of the IEEE, Vol. 91, Issue 1, January 2003, pp. 84-99.

T. A. Henzinger and C. M. Kirsch, "The embedded machine: predictable, portable real-time code", Proceedings of the ACM SIGPLAN 2002 Conference on Programming language design and implementation, pp. 315-326.

J. Templ., "Timing Definition Language (TDL) 1.5 Specification", Technical report, University of Salzburg, 2009. Available at http://www.softwareresearch.net.

G. Stieglbauer: "Model-based Development of Embedded Control Software with TDL and Simulink", PhD thesis, University of Salzburg, 2007.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for simulating a real-time system using a block-oriented simulation with a static block-update order, the system comprising:
   a clock that provides a time base for the simulation;
   at least one processor and a non-transitory computer readable medium, wherein the at least one processor executes executable code on the non-transitory computer readable medium to provide the following:
   a first task function block that includes a task release block, a task execution block, a task termination block, and a delay block, wherein the first task function block has a logical execution time interval in which are performed functions of the task release block, the task execution block, the task termination block and the delay block;
   a first trigger block configured to trigger, at a beginning of the logical execution time interval, the task release block at a first time provided by the clock; and
   a second trigger block, different from the first trigger block, configured to trigger, at an end of the logical execution time interval, the task termination block at a third time provided by the clock,
   wherein the task execution block is configured to calculate an output value dependent on an input value in accordance with a desired transfer function,
   wherein the task release block is configured to receive data from a data source and to set the input value of the task execution block dependent on the received data,
   wherein the task termination block is configured to provide the output value of the task execution block as data to a data sink,
   wherein the first trigger function block or the second trigger function block is configured to trigger the task execution block at a second time provided by the clock, and
   wherein the delay block is arranged between the task release block and the task termination block.

2. The system of claim 1, wherein the first time and the third time are subsequent points of time, wherein the time that elapses between the first time and the third time equals the logical execution time interval of the task function block, and wherein the second time either lies in the interval between the first time and the third time, the interval including the first and the third time.

3. The system of claim 1, wherein the data source is configured to supply data from a second task function block arranged upstream of the first task function block as input data, and wherein the data sink is configured to supply the output data to a third task function block.

4. The system of claim 1, further comprising:
   a further delay block arranged downstream of the first trigger block and upstream of the second trigger block, wherein the further delay block delays all signals flowing from the first trigger block to the second trigger block.

5. The system of claim 1, further comprising:
   a further task function block that includes a further task release block, a further task execution block, a further task termination block, and a further delay block, wherein the further task release block, the further task execution block, and the further task termination block are also triggered by at least one of: the first trigger block and the second trigger block.

6. A method for simulating a real-time system using a block-oriented simulation system with a static block-update order, the method comprising:
providing a first task function block that includes a task release block, a task execution block, a task termination block, and a delay block, wherein the first task function block has a logical execution time interval in which are performed functions of the task release block, the task execution block, the task termination block and the delay block;
triggering, using a first trigger block, the task release block at a first time, wherein the task release block is triggered at a beginning of the logical execution time interval;
triggering, using the first trigger block or a second trigger block different from the first trigger block, the task execution block at a second time after or equal to the first time;
triggering, using the second trigger block, the task termination block at a third time at or after the second time, wherein the task termination block is triggered at an end of the logical execution time interval; and
delaying data flow between at least one of: (i) the task release block and the task execution block and (ii) the task execution block and the task termination block,
wherein the task execution block calculates, when triggered, an output value dependent on an input value in accordance to a desired transfer function,
wherein the task release block receives, when triggered, data from a data source and sets the input value of the task execution block dependent on the received data, and
wherein the task termination block provides, when triggered, the output value of the task execution block as data to a data sink.

7. The method of claim 6, further comprising:
providing a clock that provides the first time, the second time, and the third time.

8. The method of claim 6, wherein the time that elapses between the first time and the third time equals the logical execution time interval of the task function block.

9. The method of claim 6, wherein the data source supplies data from a second task function block arranged upstream of the first task function block as input data, and wherein the data sink supplies the output data to a third task function block.

10. The method of claim 6, further comprising:
arranging a further delay block downstream of the first trigger block and upstream of the second trigger block, wherein the further delay block delays all signals flowing from the first trigger block to the second trigger block.

11. The method of claim 6, further comprising:
providing a further task function block that includes a further task release block, a further task execution block, a further task termination block, and a further delay block, wherein the further task release block, the further task execution block, and the further task termination block are also triggered by at least one of: the first trigger block and the second trigger block.

12. A non-transitory computer readable medium storing computer software that simulates a real-time system using block-oriented simulation with a static block-update order, the computer software comprising:
executable code that provides a first task function block that includes a task release block, a task execution block, a task termination block, and a delay block, wherein the first task function block has a logical execution time interval in which are performed functions of the task release block, the task execution block, the task termination block and the delay block;
executable code that provides a first trigger block and a second trigger block that is different from the first trigger block;
executable code that triggers, using the first trigger block, the task release block at a first time, wherein the task release block is triggered at a beginning of the logical execution time interval;
executable code that triggers, using the first trigger block or the second trigger block, the task execution block at a second time after or equal to the first time;
executable code that triggers, using the second trigger block, the task termination block at a third time at or after the second time, wherein the task termination block is triggered at an end of the logical execution time interval; and
executable code that delays data flow between at least one of: (i) the task release block and the task execution block and (ii) the task execution block and the task termination block,
wherein the executable code that provides the task execution block calculates, when triggered, an output value dependent on an input value in accordance to a desired transfer function,
wherein the executable code that provides the task release block receives, when triggered, data from a data source and sets the input value of the task execution block dependent on the received data, and
wherein the executable code that provides the task termination block provides, when triggered, the output value of the task execution block as data to a data sink.

13. The non-transitory computer readable medium of claim 12, further comprising:
executable code that provides a clock that provides the first time, the second time, and the third time.

14. The non-transitory computer readable medium of claim 12, wherein the time that elapses between the first time and the third time equals the logical execution time interval of the task function block.

15. The non-transitory computer readable medium of claim 12, wherein the data source supplies data from a second task function block arranged upstream of the first task function block as input data, and wherein the data sink supplies the output data to a third task function block.

16. The non-transitory computer readable medium of claim 12, further comprising:
executable code that provides a further delay block downstream of the first trigger block and upstream of the second trigger block, wherein the further delay block delays all signals flowing from the first trigger block to the second trigger block.

17. The non-transitory computer readable medium of claim 12, further comprising:
executable code that provides a further task function block that includes a further task release block, a further task execution block, a further task termination block, and a further delay block, wherein the further task release block, the further task execution block, and the further task termination block are also triggered by at least one of: the first trigger block and the second trigger block.

* * * * *